Figure 1:
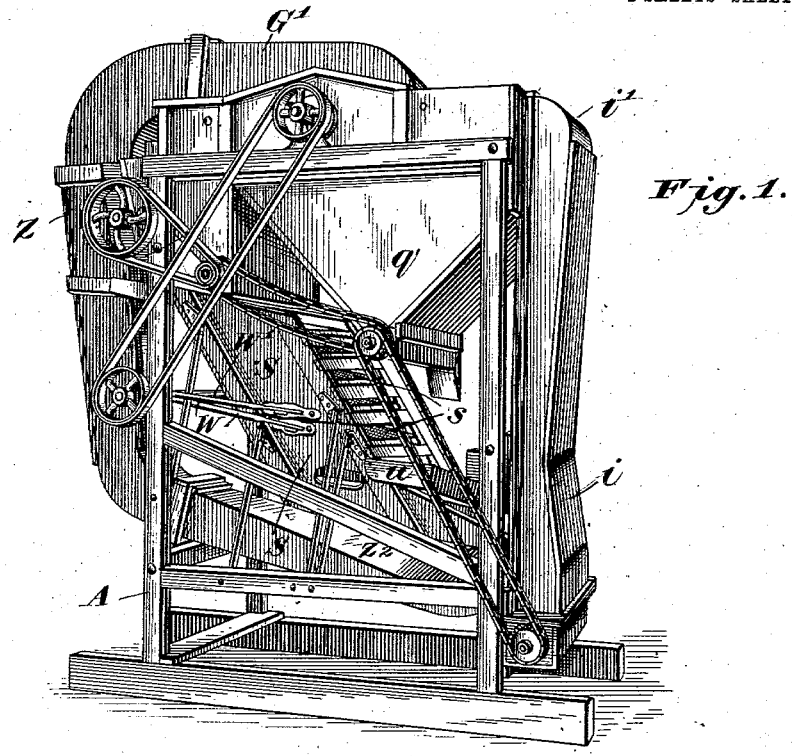

No. 752,145. PATENTED FEB. 16, 1904.
J. B. CORNWALL.
GRAIN SEPARATOR.
APPLICATION FILED MAR. 3, 1903.
NO MODEL. 2 SHEETS—SHEET 1.

Witnesses
Elmer Leavey
James R. Mansfield

Inventor
John B. Cornwall
By
Alexander & Fowell
Attorneys

No. 752,145. PATENTED FEB. 16, 1904.
J. B. CORNWALL.
GRAIN SEPARATOR.
APPLICATION FILED MAR. 3, 1903.
NO MODEL. 2 SHEETS—SHEET 2.
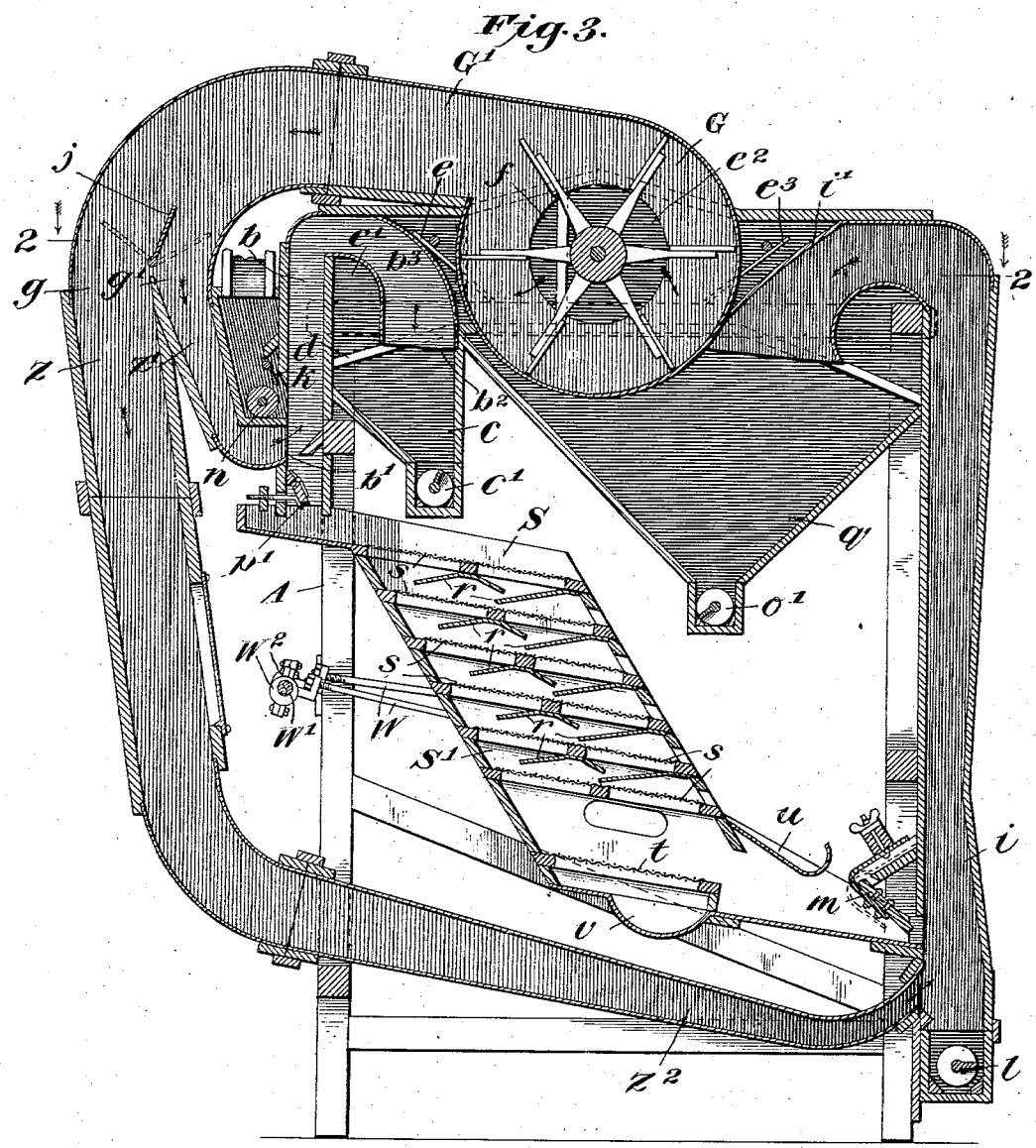
Witnesses
Elmer Leavey
James R Mansfield
Inventor
John B Cornwall
By Alexander & Powell
Attorneys No. 752,145. Patented February 16, 1904.

UNITED STATES PATENT OFFICE.

JOHN B. CORNWALL, OF MOLINE, ILLINOIS, ASSIGNOR TO THE BARNARD AND LEAS MANUFACTURING COMPANY, OF MOLINE, ILLINOIS.

GRAIN-SEPARATOR.

SPECIFICATION forming part of Letters Patent No. 752,145, dated February 16, 1904.

Application filed March 3, 1903. Serial No. 145,981. (No model.)

*To all whom it may concern:*

Be it known that I, JOHN B. CORNWALL, of Moline, in the county of Rock Island and State of Illinois, have invented certain new and useful Improvements in Grain-Separators; and I hereby declare that the following is a full, clear, and exact description thereof, reference being had to the accompanying drawings, which form part of this specification.
This invention is an improved milling or grain separator in which the grain is cleaned by subjection to air-blasts and by the action of sieves; and the object of the present invention is to provide a machine having closed air-currents circulating from the fan-chamber through the separating-trunks and so arranged that the dust and matters separated from the grain in the trunks will be collected within the machine itself, doing away with the use of or need for a separate dust-collector, such as have been heretofore generally necessary.

The principal objects of the invention, therefore, are, first, to produce a machine that will not necessarily require the assistance or coöperation of a separate apparatus for collecting or settling the dust; second, to produce a machine having two air-trunk separations and two separate air-currents, one for each trunk, both air-circuits being controlled by one fan; third, to provide a machine in which the air separations occur independently of the screens and in which the shoe carrying the sieves and screens is not inclosed within and does not form any part of the air passages or trunks; fourth, to make provision for the escape of a sufficient portion of the air-blast from the fan to prevent leakage at the blast side of the machine, so that the suction produced by the fan in the trunks will equal or be slightly greater than the pressure of the air at the blast side of the fan, thus preventing the escape of dust-laden air through any small openings in the trunks or air-circuits and also preventing the escape of air with the grain passing through the trunks.

The present machine is also distinguished from heretofore-known machines by not having its sieve-shoe or screens within the air passages or chambers, the shoe being entirely ac-
cessible at all times, and also distinguished by the peculiar arrangement and structure of the air-passages, whereby the pressure at the blast side of the fan will not exceed the pressure at the suction side thereof, thus preventing the tendency heretofore found to exist in this class of machine of the dust-laden air at the blast side of the fan to escape through any small openings or with the grain unless the machine is made absolutely air-tight. In the present invention, in fact, the air-currents while complete and endless are due more to suction than to the blast action of the fan, which has a further advantage of increasing the separating action of the air-blasts in the air-trunks.

Features of the invention for which protection is desired will be summarized in the claims following the description of the machine illustrated in the drawings, which embodies the invention in a practical manner, although I do not desire to restrict myself to any specific form, dimensions, or arrangements of parts thereof.

Figure 2:
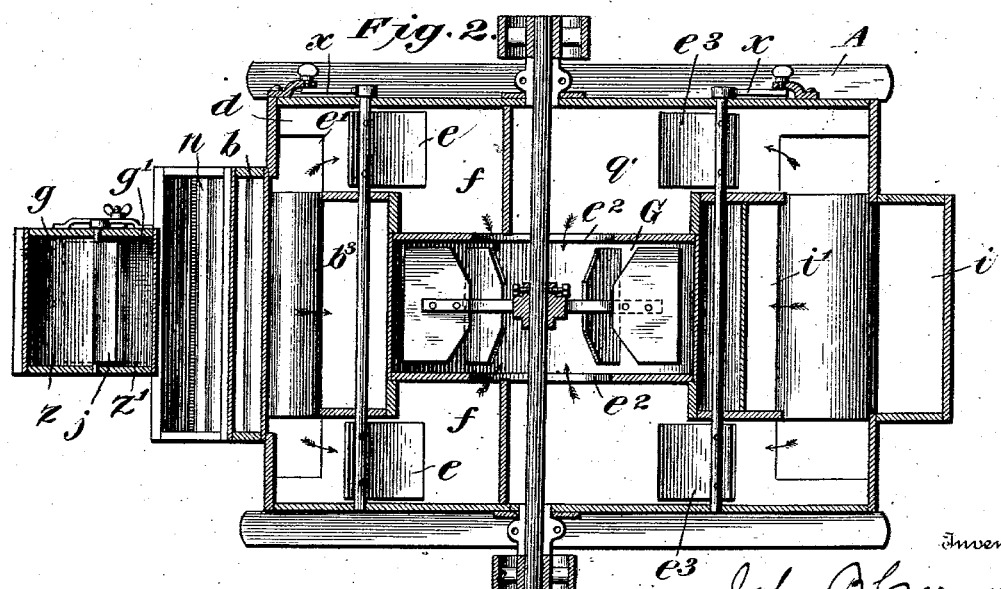

In said drawings, Figure 1 is a perspective view of the complete machine. Fig. 2 is an enlarged vertical longitudinal section therethrough, and Fig. 3 is a horizontal transverse section on line 3 3, Fig. 2.

All the parts of the machine, including the feed-hopper, the settling-chambers, the air-trunks, fan-chamber, and sieve-boxes, are supported upon a suitable frame A. Most of these parts are of ordinary construction except as hereinafter specified, so that it will be unnecessary to give a detailed specification of the construction of the several parts, particularly as these may be varied to suit the millbuilder, and a general description thereof will impart a sufficiently clear understanding of the construction and operation of the machine to enable any one skilled in this art to construct the apparatus shown in the drawings or to embody the invention in other forms, according to the nature of the work to be employed.

The grain may be spouted into the feed-hopper *a* in the usual manner. This hopper is provided with a discharge-roller *n*, and a feed-regulating valve $k$ (which may be of the "floating" type, as is well known in the art) automatically regulates the feed by the weight of grain in the hopper. From the hopper the grain is discharged into the lower end of a vertical air-trunk $b$ through an outlet $b'$, in which the grain escapes onto a weighted hinged valve $p'$, by which it is distributed onto the receiving end of the screen-shoe. In the example shown the shoe is made in two parts— an upper screen-box S and lower screen-box S', each screen-box being provided with a series of screens $s$ and underlying chutes $r$, by which the grain is properly directed onto the underlying screens, as is customary in this class of machines. Nothing is claimed in this invention upon the construction of the shoe or screen-boxes *per se*. The screen-boxes are reciprocated by means of rods $w$ from cams $w^2$ on a transverse shaft $w'$, as shown in the drawings, said shaft being journaled in brackets on the main frame and driven by any suitable means.

The large impurities are separated from the grain in passing through the shoe and are discharged onto a chute $u$ at the end of the lower screens in box S', by which chute they are conveyed to one side of the machine and discharged. From the lower screen $s$ the grain falls upon a finer screen $t$, through which the smaller impurities escape onto a discharge-chute $v$, while the clean grain passes on through the toe of the box S' and is discharged into the lower end of a vertical air-trunk $i$, in the bottom of which is a conveyer $l$, by which the cleaned grain is removed from the machine. The upper end of air-trunk $b$ communicates with a downwardly-curved passage $b^3$, leading into a settling-chamber $c$, provided with a conveyer in its bottom, and the air passes through said chamber under a plate $d$ in the bottom of passage $b^2$ into passages $e'$ at the side of the air-trunk $b$ and chamber $c$ and which lead into chambers $f$ at the inlet side of the fan-chamber G. Valves $e$ are interposed between the passage $e'$ and chambers $f$ and may be adjusted by means of the arms $x$ and retainers in the usual manner, so as to regulate the strength of the blast through the trunk $b$ into the fan-chamber.

The upper end of air-trunk $i$ communicates by means of a curved passage $i'$ with a larger settling-chamber $q$, which is constructed similarly to chamber $c$, but is considerably larger, and has a conveyer $o'$ in its bottom to discharge matters collected therein. The chamber $q$ communicates with the inlet of fan-chamber G by means of passages $e^2$, controlled by valves $e^3$, as indicated in the drawings. Said valves may be adjusted like the valves $e$ to regulate the blast of air through the trunk $i$. It will be observed that both chambers $c$ and $q$ communicate with the suction side of the fan-chamber, and the outlet or blast passage G' from the fan-chamber extends above and over the hopper $a$ and at a point adjacent to the hopper divides into two downwardly-extending branch passages $z$ and $z'$. The branch $z'$ extends down beside and under the hopper $a$ and communicates with the lower end of trunk $b$, as shown in Fig. 1, so that the grain discharged into the trunk $b$ by roller $n$ will have to pass through the current of air entering and passing upward through the trunk $b$.

A valve $j$, placed at the junction of the passages $g$ $g'$ and spout G', can be shifted so as to regulate the relative amounts of air passing through said passages.

The air passage or spout $z$ extends downward to below and partially around the sieve-box, entering the lower end of the trunk $i$ just below the discharge from the chute S' thereinto, so that the grain entering the lower end of trunk $i$ is subjected to the blast of air entering said trunk. The lower portion $z^2$ of the air-spout is narrowed and widened as it approaches trunk $i$, so as to cause the air to enter the trunk uniformly across the width thereof. The grain entering the trunk $i$, moreover, may be spread and disseminated by the weighted adjustable valve $m$, as indicated in the drawings. The several discharge-chutes and conveyers may be of any well-known construction, and are therefore only diagrammatically illustrated in the drawings.

Fig. 1 shows one arrangement for driving the fan and shaking-chutes, the feed-roller, and the several conveyers simultaneously by means of pulleys, belts, and sprocket-chains; but I do not wish to restrict myself to any particular arrangement of drive mechanism.

An improved feature of the construction of the air-pipe $z$ is placing therein, below the valve $j$, preferably a permeable section $y$, through which a modicum of air may escape. This may be simply an opening in the side of the pipe covered by a cloth or fine screen, which will prevent the escape of dust while permitting a portion of the air to filter therethrough, and this section $y$ should be of sufficient area to reduce the blast-pressure in the pipe $z$ to or slightly below the suction or upward pull in the trunk $i$.

The foregoing description in connection with the drawings will enable any one to readily comprehend the construction of the machine shown in the drawings, and of course it will be understood that the valves and feed-hopper, screen, and conveyers will be properly constructed or adapted from those well known in the art to the uses intended.

Operation: The operation of the machine is as follows: The grain is spouted into the hopper $a$ from any suitable supply and is fed therefrom by feed-roller $m$ into the lower end of the air-trunk $b$, the feed of the grain being regulated by the valve $k$, which also acts to keep the air from passing into the feed-hopper. The valve $k$ may be of such construction that it will be automatically regulated by the amount of grain in the feed-chamber and by a rod and weight at its outer end, the latter not being shown in the drawings, but such construction of valve being well known. The grain which is admitted into the air-trunk $b$ is separated from lighter impurities by the current of air passing upward through the trunk, the lighter impurities and grains being elevated by the air and carried over a deposit in the settling-chamber $c$, while the heavier and partially-cleaned grain passes downward through the air-current and is discharged through the weighted valve $p'$ onto the sieve-box S, and in passing through the sieve-boxes the coarse impurities are separated from the grain by the sieves in the usual manner and are discharged from the lower sieve-box through the side spout $u$, which carries the impurities to one side of the machine. The grain and smaller impurities passing through the sieves are finally dropped upon a fine sieve $t$, through which the fine seeds and impurities pass and are discharged at the side of the machine by the side spout $v$, while the cleaned grain passes on over the apron of the shoe, past the valve $m$, and into the lower end of air-trunk $i$, where it is subjected to a second air-blast and a second separation takes place, the cleaned grain falling into the conveyer in the bottom of trunk $i$, where it is discharged, while the light grain and impurities separated therefrom are carried up with the air through trunk $i$ and deposited in the settling-chamber $q$, from which they are discharged by the conveyer $o'$. Both the settling-chambers $c$ and $q$ are of so much larger area than the trunks $b$ $i$ that the air entering said chambers is expanded and slowed, and the impurities therein will be deposited in said chambers before the air is drawn on into the fan-chamber. The air-blast in both trunks $b$ and $i$ is produced primarily by suction in the fan; but as the air-circuits are closed the blast from the fan is also forced back into and through the trunks; but the blast from the fan, entering first the passages $g'$, is divided at the valve $j$ into two separate currents, one current passing through the passage $g'$, as described, down into the lower end of the trunk $b$ and making the first separation of the grain, while the larger portion of the air passes through the passages $z$ $z^2$, past the relief-section $y$ in the passage $z$, which allows the escape of a part of the air, but retains the dust particles in the passage. The cloth or permeable cover over the opening $y$ thus reduces the outward pressure of the air in the rest of the passage $z$ $z^2$, so that the suction of the fan would cause air to be drawn in through the discharge-openings or any small openings which may be inadvertently left open in the passages instead of the blast of air escaping outwardly through such small openings, thus making the machine dustless. It is not intended that any large part of the air shall be allowed to escape from the machine at the point $y$, but only such fraction thereof as will practically balance the outward and inward pressures on the opposite sides of the fan, or, if anything, will slightly increase the pressure on the suction side of the fan, and therefore the upward draft through the trunks $b$ $i$ will be due more to suction than to blast-pressure. The air being reduced in pressure in passage $z$ passes through the nearly horizontal part of the passage $z^2$, which is reduced in depth and increased in width to the full width of the trunk $i$ at the point where the grain passes from the shoe into the lower end of the trunk $i$, and the suction of the fan beginning to operate more forcibly as the air nears the fan, and insures a good separation of the grain at this point.

The air-trunks can be readily removed, especially at the front of the machine, when it is desired to change the sieves in the shoe.

It will be observed that the sieves are always open to inspection and that there is no air blast or suction through the sieves which will interfere with the action of the air-trunks or with the sieves. In the machine shown there are two separate air-currents independently controllable, both currents being closed and both operated by one fan, and that at all times the suction of the fan will cause a slightly-greater pressure at the outlet end of the trunks than at the inlet ends, so that any impurities separated from the grain by the air-blast will be certainly carried into the dust-chambers and there deposited.

Having thus described my invention, what I therefore claim as new, and desire to secure by Letters Patent thereon, is—

1. In a grain-separator, the combination of a pair of air-trunks suitably separated, a pair of settling-chambers respectively communicating with the upper ends of said air-trunks, a fan-chamber communicating at its inlet with both said settling-chambers; means for feeding grain into the first trunk, a screen-shoe arranged to receive grain from the first trunk, screen it, and discharge it into the second trunk; a branched air-passage communicating with the outlet of the fan-chamber, one of the branches leading into the first air-trunk below the point of discharge of grain thereinto, the other branch leading into the second air-trunk below the point of discharge of grain thereinto, all arranged to form two closed air-circuits formed in the machine independent of the screen-shoe through the respective air-trunks, and said screen-shoe operating outside of both said closed air-circuits, substantially as specified.

2. In a grain-separator, the combination of two air-separating trunks, two dust-settling chambers, respectively communicating with the upper end of said trunks, a fan-chamber, passages connecting the suction side of the fan-chamber with the said dust-settling chambers, an air-passage leading from the blast side of said fan-chamber, said passage dividing into two branches, said branches respectively leading into the lower ends of the respective air-trunks thereby forming two closed air-circuits in the machine, a relief device in said air-passage to keep the pressure at the blast side of the fan below the suction-pressure at the inlet side thereof, means for delivering grain into the first air-trunk, and a screen-shoe onto which the grain is discharged from the first air-trunk, and by which the grain is delivered into the second air-trunk, all substantially as and for the purpose described.

3. In a grain-separator, the combination of an air-trunk, a settling-chamber, a fan-chamber, passages connecting the settling-chamber with the inlet of the fan-chamber, an air-passage connecting the outlet of the fan-chamber with the lower end of the air-trunk, and forming a closed air-circuit, means for preventing an excess pressure of air in the outlet-passage of the fan, and means for feeding the grain through the lower end of said trunk, substantially as described; with a screen-shoe outside the air-circuit onto which the grain is discharged from said trunk, a second air-trunk through which the grain is discharged from said shoe, a settling-chamber communicating with the upper end of said second trunk and with the inlet of the fan-chamber, and an air-passage independent of the screen connecting the outlet of said fan-chamber with the lower end of said air-trunk and forming a second closed air-circuit, substantially as described.

4. In a grain-separator, the combination of a pair of air-trunks suitably separated, a pair of settling-chambers respectively communicating with the upper ends of said air-trunks, a fan-chamber, communicating at its inlet with both said settling-chambers; means for feeding grain into the first trunk; a screen-shoe arranged to receive grain from the first trunk, screen it, and discharge it into the second trunk, a branched air-passage communicating with the outlet of the fan-chamber, one of the branches leading into the first air-trunk below the point of discharge of grain thereinto, the other branch leading into the second air-trunk below the point of discharge of grain thereinto; means in said passage for regulating the currents of air through its branches, and an air-pressure relief device in the branch leading to the second air-trunk, all arranged to form two closed air-currents in the machine independent of the screen-shoe through the respective air-trunks, and said screen-shoe operating outside of both said closed air-circuits, substantially as specified.

In testimony that I claim the foregoing as my own I affix my signature in presence of two witnesses.

JOHN B. CORNWALL.

Witnesses:
   JOHN J. SWIM,
   F. M. DILLON.